(12) United States Patent
Palmer

(10) Patent No.: US 6,194,012 B1
(45) Date of Patent: **\*Feb. 27, 2001**

(54) TREATMENT OF MEAT

(75) Inventor: Roger Keith Palmer, Papatoetoe (NZ)

(73) Assignee: Tenderland Limited, Papakura (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 08/893,233

(22) Filed: Jul. 15, 1997

Related U.S. Application Data

(63) Continuation-in-part of application No. 08/351,297, filed on Dec. 9, 1994, now Pat. No. 5,670,195.

(30) Foreign Application Priority Data

Jun. 11, 1992 (NZ) ........................................ 243104

(51) Int. Cl.[7] .................................................. B65D 85/00
(52) U.S. Cl. .......................... 426/129; 426/106; 426/312; 426/315; 426/316; 426/418; 426/513; 100/910; 53/432; 53/436; 53/527
(58) Field of Search ..................................... 426/418, 129, 426/106, 312, 315, 513, 414, 316; 53/432, 434, 436, 527; 100/910

(56) References Cited

U.S. PATENT DOCUMENTS

| | | |
|---|---|---|
| 2,105,941 | 1/1938 | Gleason . |
| 3,627,393 | 12/1971 | Hickson et al. . |
| 4,919,955 | 4/1990 | Mitchell . |
| 5,155,974 | 10/1992 | Garwood . |
| 5,348,752 | 9/1994 | Garlich . |

FOREIGN PATENT DOCUMENTS

| | | |
|---|---|---|
| 0599113 | 7/1987 | (AU) . |
| 7505087 | 1/1988 | (AU) . |
| 0625149 | 3/1988 | (AU) . |
| 7918987 | 3/1988 | (AU) . |
| 4502289 | 4/1991 | (AU) . |
| 0211060 | 2/1985 | (NZ) . |
| 0220876 | 8/1991 | (NZ) . |

OTHER PUBLICATIONS

*New Zealand Meat Producer*, "Paving the Way for Chilled Meat", Second Quarter 1992, pp. 26–27.
*Vesten AG Division Food Concept*, "Gasflush Packing Systems Information" No date.
Leblanc et al., *Journal of Food Processing and Preservation*, 11(1987) pp. 209–235.

*Primary Examiner*—Lien Tran
(74) *Attorney, Agent, or Firm*—Birch, Stewart, Kolasch & Birch, LLP

(57) ABSTRACT

A method of storing and aging a meat which comprises the steps of containing meat in a controllable environment under a mechanical compression, substantially separating a majority of a surface of the meat from direct contact with a gas present in the controllable environment, controlling the gas in the controllable environment by reducing free oxygen gas in the controllable environment and controlling gas pressure in the controllable environment while protecting a majority of the surface of the meat from the effects of a pressure variation, and holding the meat under the controllable environment for a period of time within a predetermined temperature range; provided that the meat is held under the mechanical compression during the controlling of the gas in the controllable environment.

12 Claims, 4 Drawing Sheets

TREATMENT OF MEAT

This application is a continuation-in-part of application Ser. No. 08/351,297 filed on Dec. 9, 1994, now U.S. Pat. No. 5,670,195 the entire contents of which are hereby incorporated by reference.

This invention relates to improvements in meat treatment and more particularly to improvements in methods and apparatus for treatments of meat in handling, storing, transporting and/or ageing.

Throughout this specification it is to be understood that references to "meat" include all forms of meat generally considered to be edible including fish, poultry and offal of all descriptions.

Methods and apparatus for meat treatment are steeped in history and extend from rather primitive steps in merely "hanging" carcasses for a predetermined period of time to fast or slow cooling of hung carcasses and other developed techniques.

More recently, techniques for "off bone" meat handling, also known as "hot deponing", have been developed as producers look to add value to meat products, increased efficiency and reduced costs. It is known that off bone meat handling or hot deboning can lead to an increased yeld of meat from the carcass and reduce opportunities for meat contamination prior to subsequent treatment.

While off bone meat handling or hot deboning has significant benefits in enabling producers to improve the efficiency of the desirable rapid cooling of meat after slaughter; this is owing to only the required meat requiring cooling, considerable difficulty has been experienced by producers using the off bone or hot deboning techniques in retaining the tenderness of meat handled in this way as often traditional methods of ageing have been difficult to apply in circumstances where the carcass cannot be used to provide support for the meat after slaughter. In particular, traditional methods predominately use the bone structure of the carcass, often together with certain hanging techniques to resist forces which occur in the meat post slaughter, for example during chilling of the meat after slaughter and in the period prior to, during and after the onset of rigor.

When off bone or hot deboning meat handling techniques are utilized, the quality of resultant meat can suffer, for example loss of desirable meat characteristics through cold shortening as the meat is rapidly cooled after removal from the carcass; to the extent that the resultant meat will suffer a permanent loss of desirable eating characteristics, particularly tenderness, or alternatively, will require significantly long ageing times to overcome the damage, with attendant potential losses through contamination and other incidences.

One technique which has been developed is where the meat is subjected to relatively high pressures in a hydraulic pressure vessel for a short period of time, typically less than one hour. It has been found that such a technique can tend to enhance the tenderness of the meat and fluid retention of the meat, however, substantial difficulties are encountered in physical handling of the meat, in plant and machinery provision and in view of the fact that inevitably a high labour requirement is necessary.

The abovementioned pressure technique is as yet uncommercial and potentially has associated problems of high cost, undue process time consumption and the like. There remains, in addition, a difficulty in subsequent meat storage in a manner which retains the quality of the meat over a normally required period.

Attempts have been made to age off bone meat in substantially anaerobic conditions utilising container apparatus. Such an apparatus is described in New Zealand patent specification No. 220876, however, this apparatus carries with it inherent problems of dealing with weepage or drip of the meat during storage, together with contamination of the weepage or drip during the course of storage and consequent contamination of at least some portions of the meat curing storage, or on removal of the meat from the storage arrangements. Furthermore, it has been found in practice difficult to control the extent of pressure applied to the meat and maintain the pressure on the meat.

In meat handling there is a general problem of transportation from a location relatively remote from markets and storage until sale, without resorting to freezing. It is well accepted that freezing meat inherently damages its characteristics and saleability.

Attempts have been made to store meat in environments having low free oxygen such as vacuum packing or modified atmosphere packaging utilising carbon dioxide and/or nitrogen. There is, however, evidence to suggest that direct exposure of meat to the gaseous phase can result in a deleterious effect on the meat over time.

It is an object of this invention to come some way in overcoming the abovementioned problems or at least provide the public with a useful choice.

According to one aspect of this invention there is provided a method of treatment and/or storage of meat including the steps of containing the said meal in a controllable environment under compression and at a temperature above the freezing temperature of meat in a controlled free oxygen reduced environment.

According to a further aspect of this invention there is provided a method of treatment and/or storage of meat including the steps of containing said meat in a controllable environment under compression, separating a surface of said meat from any gas present by substantially gas impermeable portions of a containment means, controlling said environment to reduce free oxygen in said environment, holding said meat under such conditions within a predetermined temperature range for a predetermined period of time.

According to a further aspect of this invention there is provided a means of treatment and/or storage of meat including a closeable container having, said container capable of at least partially defining a chamber, means to control an environment in the chamber, said chamber housing a compression means provided to apply a compression to meat contained within said chamber while said meat is contained in the controlled environment.

According to a still further aspect of this invention there is provided a container of meat including a container in which treat is contained under compression and at a temperature above the freezing temperature of meat in a controlled free oxygen reduced environment.

Other aspects of this invention will become apparent from the following description.

The preferred form of the invention will now be described with reference to a method and apparatus of storing and ageing fresh boned meat.

To assist in disclosure of the method of the invention, the preferred form of apparatus used in carrying out the method is also described. It is to be appreciated that this apparatus is in no way limiting and other apparatus, such as the examples described hereinbefore and others may be also utilised in carrying out the method of the invention.

It is to be appreciated that throughout this specification and particularly with reference to the embodiments described herein, reference is made to various empirical measurements. This reference is made purely for the purposes of clarity of the description and in relationship to the particular embodiment described. The references are in no way limiting, particularly having regard to the general co-relationship between temperature and time in methods and apparatus for handling meat.

The method and apparatus is also described with reference to the accompanying drawings in which:

Figure 3:
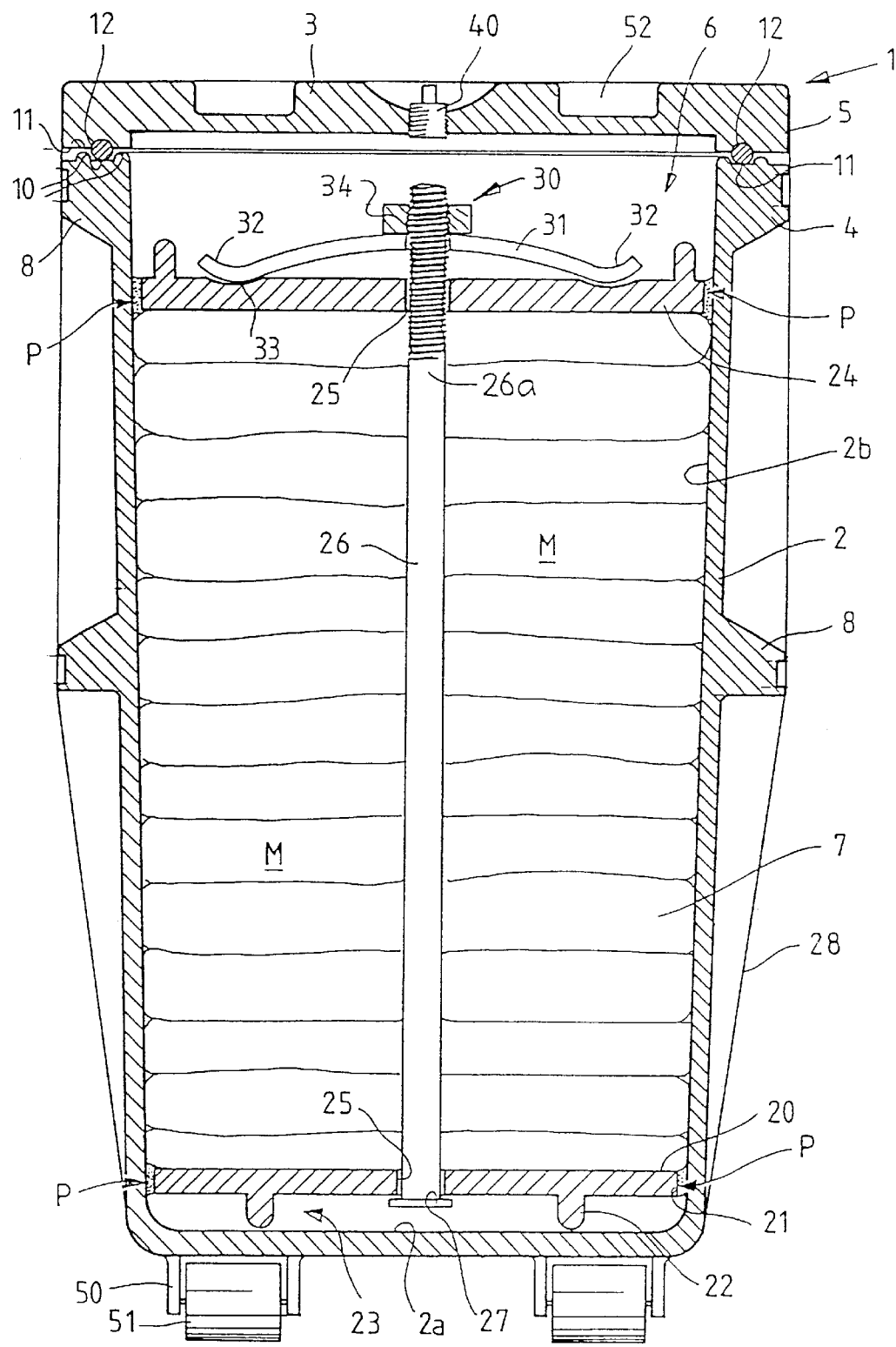
FIG. 3 is a substantially diagrammatic cross-sectional side view of the apparatus of this invention filled with meat in a meat storage and ageing condition.

With reference to the drawings and in particular FIG. 3, the apparatus of this invention is generally indicated by arrow 1 incorporates a container having a substantially open topped container body portion 2 and a closure lid 3 engageable thereon to seal between opposing flanges 4 and 5 to close an opening 6 and provide a substantially enclosed chamber 7 within the apparatus 1 within which a charge of meat M can be placed and stored for treatment.

In the preferred form of the invention, the apparatus 1 is manufactured from a selection of suitable, preferably inert to meat and "hygienic" materials suitable for food contact, such as certain plastics, metals, stainless steel and the like. Portions in direct contact with meat are provided in substantially gas impermeable materials such as glass reinforced plastics and like.

Preferably, the container 2 is provided with a pair of spaced apart substantially peripheral ribs 8 outwardly grooved, said ribs 8 acting as "buffer" portions and said grooves being provided to facilitate banding of the containers together using metal strapping and the like to facilitate binding of containers 2 of the apparatus 1 into a substantially palletised assembly as described hereinafter and with reference to FIG. 4.

Preferably, at least the flange 4 of the container 2 is provided with a pair of spaced apart upwardly directed ribs 10 thereon defining and flanking a sealing face 11 with which an endless sealing ring 12 positioned between a groove in the lid 3 flange 5 and the container 2 flange 4, such that upon the lid 3 being urged and held against the container 2, it will be appreciated the sealing ring 12 will create an effective fluid tight seal between the container 2 and lid 3 and facilitate the provision of a controlled environment in the chamber 7.

The chamber 7 is able to accommodate the charge of meat M and in the preferred form incorporates a first or lower support portion 20 arranged to position substantially within the chamber 7 preferably adjacent a base 2a thereof, to provide a substantial "false floor". A peripheral edge 21 of the support portion 20 is arranged to be a substantially close but nevertheless sliding fit with sides of the interior of the container 2 to enable limited passage of fluids such as meat weepage or drip and the like from the charge of meat M thereabove, yet of a sufficiently small gap to prevent meat M from extending through such gap when under pressure.

Preferably the gap is such that in use a body of weepage or drip P is held between the edge 21 of the first support portion 20 and the container 2 sides under capillary effect.

The support means 20 preferably has a series of projections 22 thereon, able to impinge a lower floor portion 2a of the container 2 to space the first support portion 20 from the base 2a and define a receptacle portion 23 therebeneath within the chamber area 7.

A second or upper support portion 24 is provided to position in the container 2 adjacent an upper portion 2b thereof and in use above the charge of meat M, supported by the first support portion 20. The second support portion 24 in the preferred form of the invention is; like the first support portion 20 provided as a substantially planner member of substantially robust construction having a central bore 25 therethrough, through which a linking tensioning means 26 is provided to link the first support portion 20 with the second support portion 24.

Figure 4:
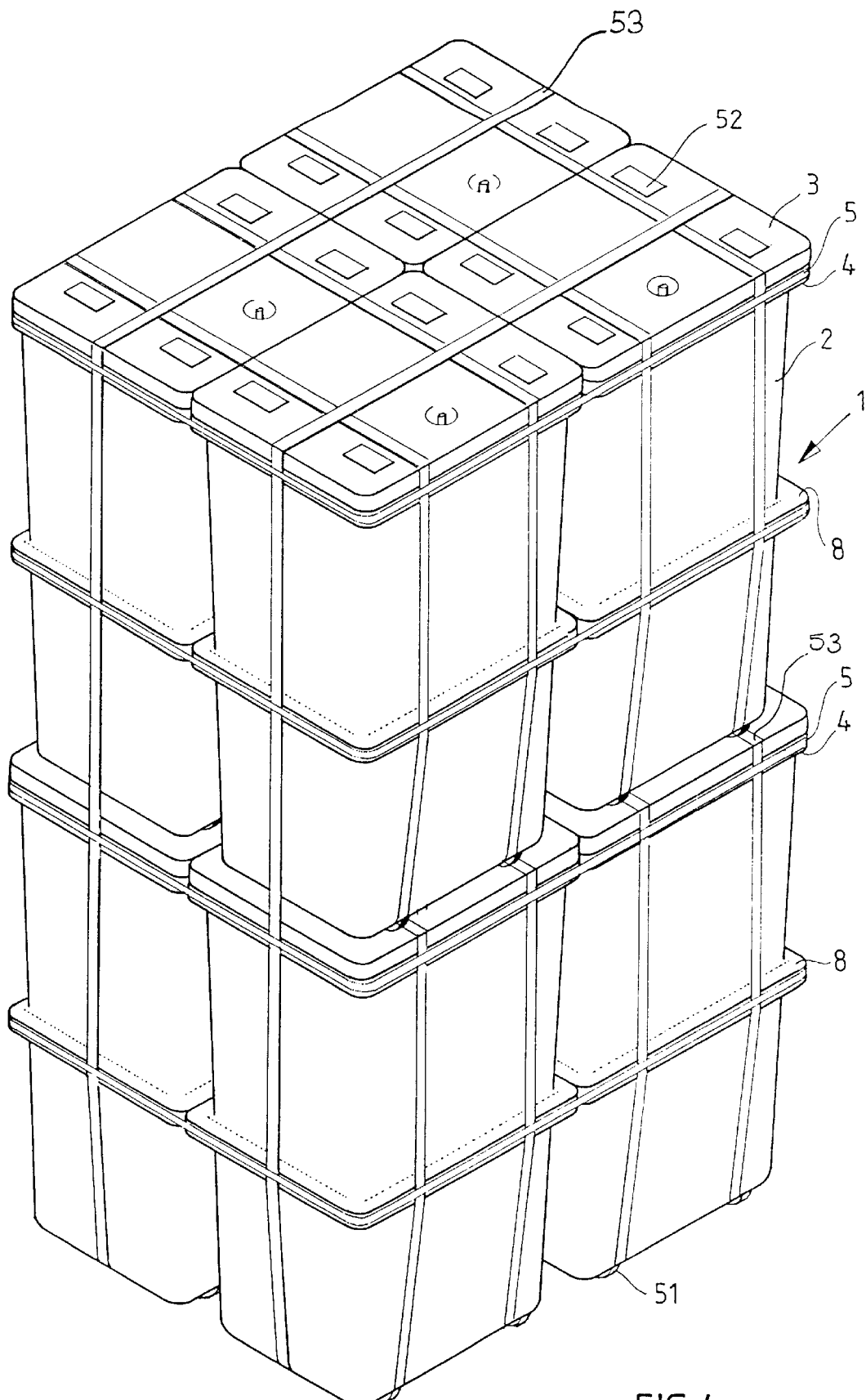
FIG. 4 is a diagrammatic view of a packaged stack of the apparatus of FIG. 1 arranged in a unitary condition for convenient transportation.

The tensioning means 26 is coupled with lower and upper first and second support portions 20 and 24 as shown in FIG. 4; preferably engaged with the first support portion 20 via a suitable flange 27 which impinges on an underside thereof; engagement with the second support portion 24 being via a compression assembly 30 mounted about an upper portion 26a of said tensioning means 26 and impinging on an upper surface of said second support portion 24. This assembly is also shown in plan view in FIG. 2.

The tensioning means 26 is hollow to facilitate communication between areas of the chamber 7 above and below the support means 24 and 20 respectively.

Figure 2:
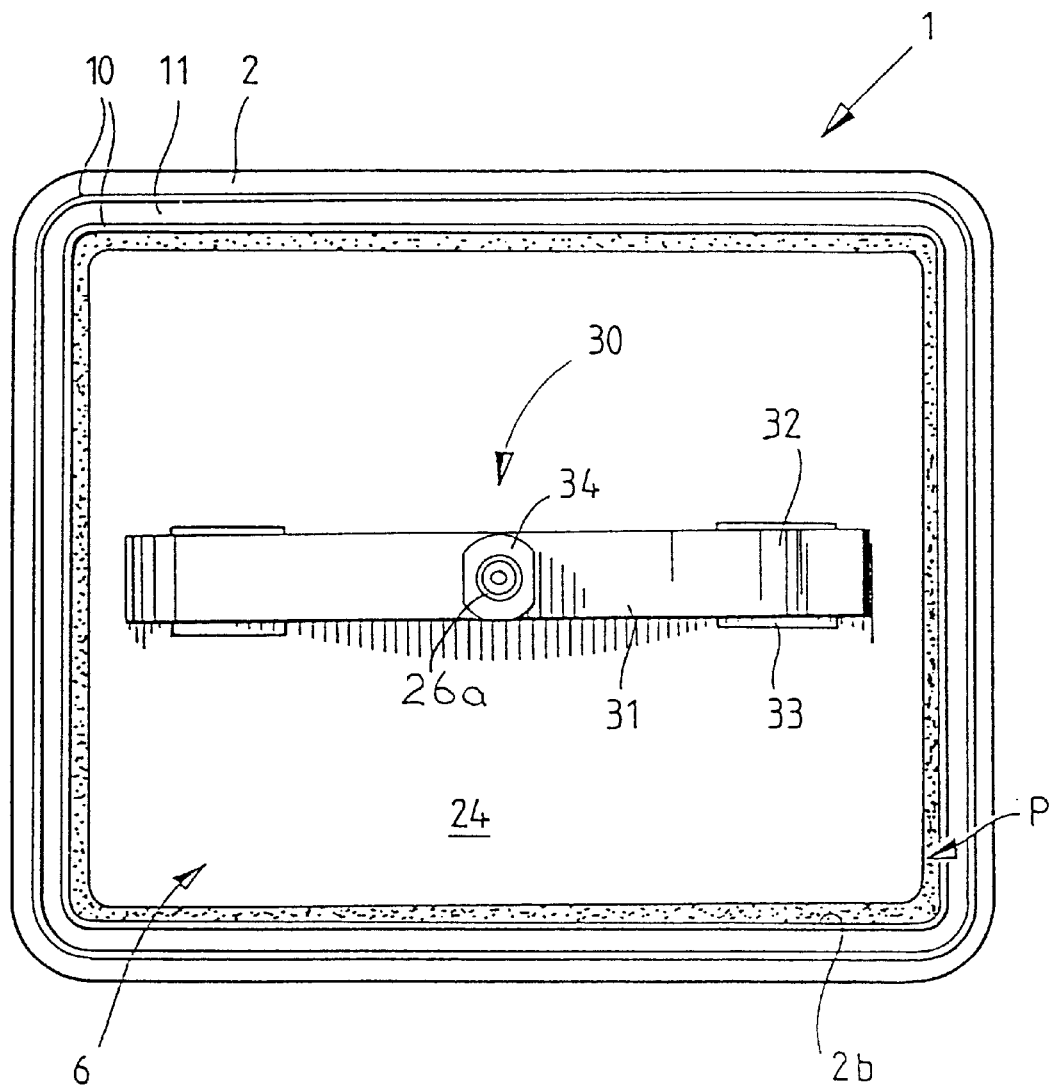
FIG. 2 is a plan view of the container of FIG. 1 with the lid removed.

With reference to FIGS. 2 and 3, in the preferred form of the invention, the compression assembly 30 is provided as an elongate resilient leaf spring 31 preferably formed in plastics coated spring steel material which is medially arched upwardly to provide a bore 32 which preferably fits about the outwardly screw-threaded upper portion 26a of the tensioning means 26.

The leaf spring 31 preferably has outwardly arranged distal feet 32 which are in the preferred form of the invention engaged in a substantially sliding fit engagement within suitably shaped recesses 33 in the upper second support member 24.

An internally screw-threaded nut 34 tensioning means 26 and can be tightened to compress the spring 31 to a predetermined tension. It will thus be appreciated that a compression provided by the compression means 30 onto the second support portion 24; itself engaged on the tensioning means 30 over a charge of meat M, a compression force will be imparted to the meat M between the first and second support means 20 and 24.

Once compression is complete, the lid 3 is engaged and sealed over the container to open end 6 and is held in a closed condition via suitable banding means 28 as is shown by FIG. 3. The banding means 28 in the preferred form of the invention is provided as a pair of strips which engage about the closed container and when tensioned, maintain the lid 3 securely positioned on the container 2 with sufficient tension to maintain a fluid tight seal of the chamber 7. In alternative arrangements, it will be appreciated that other clamping means and the like may be provided to securely engage the lid 3 with the remainder of the apparatus 1.

A valve means 40 is provided to enable controlled communication through the container 2 wall. In the preferred form of the invention, the valve means 40 is provided through the lid 3 of the apparatus 1 and is provided in a form of a normally closed valve which is openable upon insertion of a probe and the like. Thus the valve means 40 enables controlled communication between an exterior of the apparatus 1 and the chamber 7 when the apparatus 1 is in a closed condition.

Figure 1:
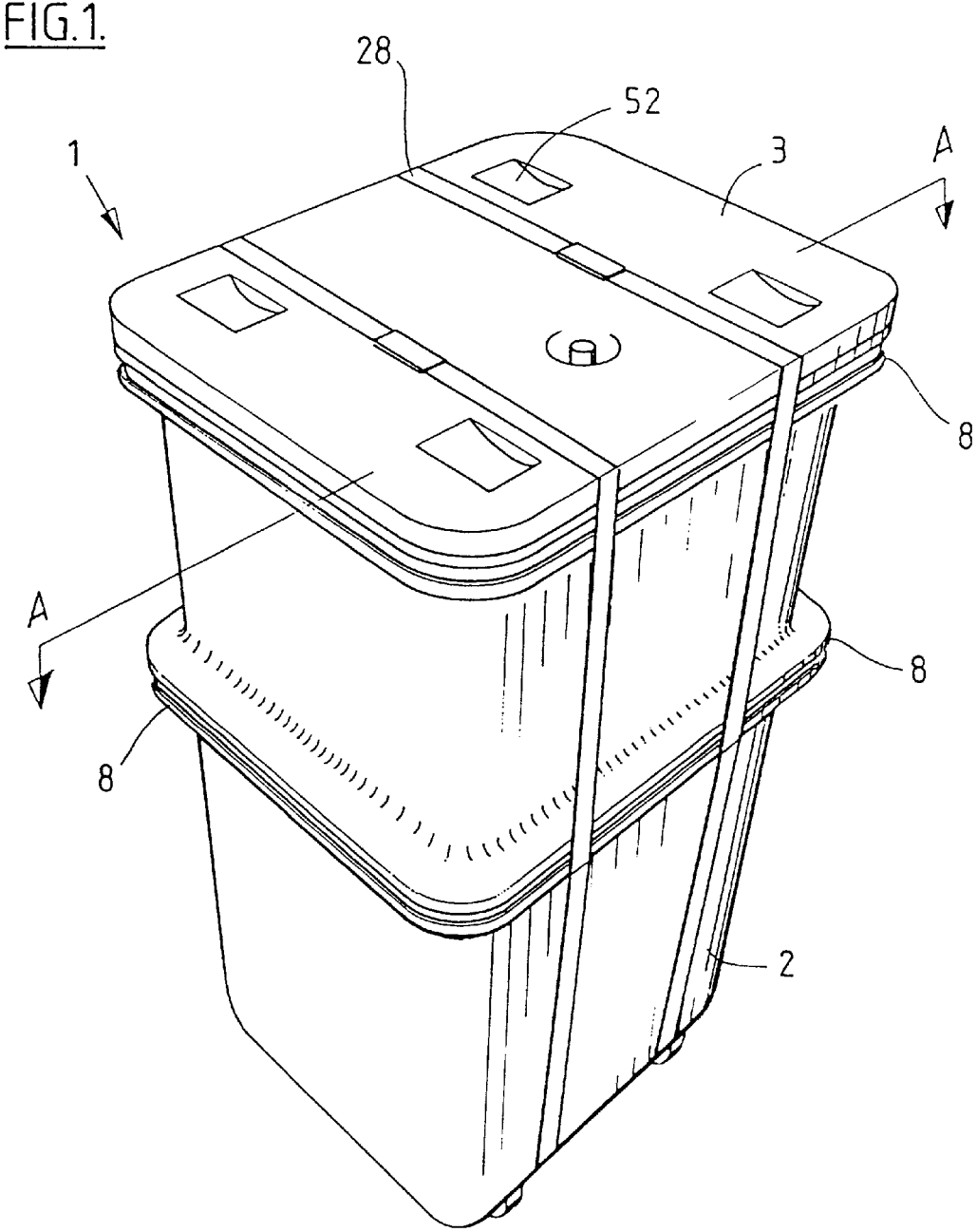
FIG. 1 is a perspective view of the apparatus of this invention in a substantially closed condition.

Preferably an exterior of the base of the container 2 is provided with lugs 50 thereon for mounting ground wheels 51 thereon. In the preferred form of the invention, preferably six wheels 51 are provided. These wheels 51 facilitate ready movement of the apparatus in use. Furthermore and with reference to FIGS. 1, 3 and 4, an outer upper surface of the lid 3 is arranged with corresponding depressions 50 into which wheels of another similar container can be engaged, so as to enable stacking of containers for storage and/or transportation and in particular, to arrange for coupling of the containers into a transportation assembly as is shown by FIG. 4.

With specific reference to FIG. 4, it will be appreciated that a stack of 4 substantial similar containers can be engaged into a single "parcel" by engaging the containers into four stacks of two and by then arranging banding 53 both vertically and horizontally about the stack, the banding 53 being suitably tensioned so as to hold the stack as a single assembly.

In the preferred form of the invention, the ground wheels 51 of the containers forming the base of the stack can be used for movement of the assembly in use. It will be seen that the ribs 8 form a buffer to enable the containers to rest one against the other relatively securely and the outward grooves therein serve to hold the horizontal banding about the assembly to maintain the assembly secure for transportation.

In the preferred form of the invention, the containers 2 are sufficiently tapered to enable them to be stacked one inside the other for storage and/or return transportation. When stacked one inside the other, it is envisaged that the lower rib 8 will provide a deterrent against jamming of the containers one with the other.

The ribs 8 of the containers 2 also preferably double as lifting lugs to enable use of a forklift or other lifting arrangement with the container to facilitate convenient handling of he apparatus in both a filled and unfilled state.

A preferred method of operation of the invention utilizing the aforementioned apparatus will row be described with reference especially to FIG. 3.

In the preferred form the apparatus 1 is arranged in an open state with the first support portion 20 and tensioning means 26 engaged and positioned in the open container 2. A plurality of fresh de-boned meat portions are placed into the container 2 resting on the first support portion 20 approaching a level adjacent the opening 6.

In the preferred form, preferably placement of the meat portions into the container 2 is achieved by raising the lower support means 20 upwardly in the container on a suitable support and to placing the meat thereon, the lower first support portion 20 is progressively lowered as the meat portions are placed thereon to form the contiguous body of meat M until such time as the first lower support member 20 rests upon the base 2a adjacent the receptacle portion 23.

Thereafter the second support portion 24 is engaged with the tensioning means 26 and the compression means assembly 30 is engaged and tightened to provide the predetermined degree of compression upon the meat M within the chamber 7. In the preferred form approximately 3 lbs per square inch pressure is applied to the meat initially, however, pressures of between 0.5 lbs and 10 lbs per square inch could also be appropriate.

It will be appreciated that upon tightening of the compression means 30, the effect is to squeeze or compress the charge of meat M between the lower an upper support means 20 and 24 and to expel excess weepage or drip and air, particularly air containing free oxygen from within and about the charge of meat M adjacent interior faces of the container 2 and the surfaces of the lower and upper support means 20 and 24 to substantially envelope the charge of meat within the container in a physically restrained manner.

In the preferred form of the invention, the compression means 30 is arranged of a predetermined strength so that it is difficult to apply a compression to said meat which is in excess of that which is predetermined and thus cause a deleterious effect on the meat, such as undue expulsion of fluids from the meat due to over compression. The lid 3 is then placed over the container 2 and is sealed in position via the banding 28 to form the chamber 7.

The charge of meat is thus arranged in the chamber 7 consolidated as a substantially contiguous body or block of meat portions with an area exposed within the chamber, not in contact with the surfaces of the first and second support means 20 and 24, or interior faces of the container 2, being relatively small and certainly less than the area of each portion of meat making up the contiguous block or body of said charge of meat.

The method then includes the connection of a vacuum via the valve 40, whereby a vacuum of between approximately 10 and 80% and preferably 60% is applied to the chamber, followed by an inflow of carbon dioxide gas which is found to be relatively non-reactive with the meat charge M due to the limited meat surface area exposed. The gas flushing cycle is repeated several times until such time as the controlled environment within the chamber 7 reaches a substantially free oxygen reduced environment in the preferred form of less than 500 parts per million. An upper practical limit is considered to be in the order of 50,000 parts per million or 5%.

Preferably the chamber 7 is exposed to a series of cycles of partial evacuation to a low vacuum level, followed by an inflow of carbon dioxide, while the meat M is contained under compression. It will thus be appreciated that free oxygenated gas situated between the meat M is substantially progressively expelled yet the meat in the chamber 7 is not subjected to sufficient vacuum to cause undue damage to the meat M-structure.

The gas flushing in the preferred form of the invention includes three to five cycles of initial vacuum to approximately 50 to 60% and subsequent inflow and pressurization of the chamber 7 with carbon dioxide to approximately 1.2 atmospheres. At completion of gas flushing, preferably the chamber 7 is retained pressurized under positive carbon dioxide pressure to approximately 1.2 atmospheres.

During initial storage, it is intended that this pressure can be maintained, by way of a pressure sensor valve and coupling with a pressurized source of supply so that the positive carbon dioxide pressure can be maintained on the chamber 7 until a predetermined level of carbon dioxide saturation can be achieved, this can also be continued during ongoing storage and treatment of the meat.

It will be appreciated that the gas flushing steps not only have the effect of reducing free oxygen from the chamber 7 but also assist in removing remaining air from between the portions of the meat M, thus assisting meat compaction.

Upon compaction of the meat M, the first and second support portions 20 and 24 tend to move closer toward one another. The compression means 30 thus preferably accommodates this change in position yet maintains compression upon the meat M during subsequent ageing. Should further compaction of the meat incur during ageing, such as by thermo-contraction, fluid loss and the like, the compression means 30 will also accommodate this movement and retain a relatively even compression upon the charge of meat throughout the storage/ageing life.

The apparatus, with the charge of meat therein, in the controlled environment is then reduced in temperature as rapidly as possible to a temperature of plus or minus 1° C. and is held within such temperature range for a period of up to 1 day to 6 months depending on the species involved. The compaction of the meat M and maintained compression via the compression means 30 holds each portion of the meat M in the bulk of meat in a physically restrained condition and in a best condition to enable rapid cooling of the meat without cold shortening, to thus improve the quality of the resultant meat and resist deterioration of meat quality after deboning and prior to the meat M reaching a stablised condition within the apparatus 1.

By this method and apparatus it will be appreciated that conditions are provided within the apparatus 1 whereby the meat can be held in the substantially stable condition for long periods of time whereby the natural ageing process of meat which occurs over time can occur without degradation of the palatability of the meat.

It will be appreciated that the area of meat exposed to gas within the chamber is extremely small, if at all and as the weepage or drip P tends to gather in the vicinity of the periphery 21 of the lower and upper support portions 20 and 24 and the adjacent container 2 a liquid phase separator is created between the meat and the gas within the chamber 7.

A physical barrier of the gas impermeable container portions and liquid weepage or drip barrier to the gas tends to; in the case of the use of a carbon dioxide rich environment, inhibit absorption of carbon dioxide by the meat, compared to the absorption rate which is normally encountered when meat is exposed directly to the gas. This is thought to be as a result of most of the meat being enclosed in the gas impermeable housing of the container and the effect on the weepage or drip of the carbon dioxide. The small surface area of meat exposed relative to the volume charge of meat also means that in the event some free oxygen remains available in the chamber 7, the effect on the meat will be minimal.

It is felt that small area of the liquid phase of weepage or drip tends to be infused with carbon dioxide and this translocates through the charge of meat between the meat portion in juxtaposition, lowering the pH of the weepage or drip, retarding multiplication of anaerobic bacteria by providing a buffered solution of carbonic acid with the free fluids associated with the surface of the meat. The pH of the liquid phase of the resultant weepage or drip is usually lower than the normal pH of meat.

Where an initial rapid translocation of carbon dioxide occurs through the weepage or drip a relatively slow absorption of carbon dioxide into the meat follows reducing any deleterious effect on the meat.

At the termination of the storage period, removal of the meat from the container is conveniently facilitated by removal of the lid 3 and dissembly of the compression assembly 30 and the removal of the second support portion 24. Thereafter, a lifting means, for example operated by an overhead gantry and the like can be engaged with the upper portion 26a of the tensioning means 26 and the-assembly be lifted from the container to pull the charge of meat supported on the first support portion 20 outwardly of the container 2. The charge of meat can then be moved to a suitable receptacle and be released to enable the meat to spill therefrom into a collection area. It will thus be appreciated that the resultant meat can be conveniently handled and treated in substantial bulky amounts which would otherwise be difficult and inconvenient to handle on a manual basis.

It has been found that by subjecting the charge of meat to compression at relatively low temperatures in the environment of low free oxygen over a period of time and allowing the ageing of the meat to occur, the characteristics of the meat are enhanced over traditional storage techniques, particularly in tenderness, juiciness, colour stability and retention of fluids.

In view of the length of time meat can be stored under such conditions it is possible for the treatment process to be carried out during transportation of the meat in temperature controlled conditions.

Accordingly, this method enables the storage and treatment of meat according to the method and apparatus described, including placement of contained meat in containers and subsequent despatch of the meat to markets during the treatment process. On arrival at the market, the meat can be removed from storage, having been suitably processed during the course of transit and sold as aged fresh meat, thus conveniently facilitating the distribution of meat to distant markets with the additional advantage of enhancing or at least retaining the quality of meat by virtue of the methods and apparatus of the invention.

While the invention has been described with reference to gas flushing utilising carbon dioxide, it is to be appreciated that in alternative forms of the invention alternative gases such as nitrogen and the like can be utilized, subject to those gases not being adversely reactive with the meat, or otherwise affecting the taste and quality of the meat.

In a further embodiment of the invention, the method includes the flushing of the container when in an open condition with a flushing gas such as carbon dioxide (preferably heavier than air) so that during filling of the container, the meat is dropped into a pre-flushed container. This state can be completed by gas flushing of the container when closed as described hereinbefore. In this way, it will be appreciated enhanced gas flushing may be provided although this is in no way essential to the invention.

The storage temperature of meat for ageing, while in the preferred form of the invention being plus or minus 1° C. can be increased or reduced in temperature, such as from a level just above a temperature at which the charge of meat begins to freeze, to a level at which the meat aging is compromised by other deleterious side effects. Depending on the nature of the meat, this temperature could be from as low as −2.5° C.

By this invention there is provided a method and apparatus for the storage and treatment of meat to facilitate ageing of said meat under conditions of compression, low temperature and controlled environment where the growth of unwanted bacteria and other deterioration of the meat is restricted.

Whilst the invention has been described with reference to specific apparatus and alternative embodiments described, it is to he appreciated that the invention is not limited to such arrangements and methods; modifications and developments can be incorporated without departing from the scope or spirit of the invention as defined in the appended claims.

What is claimed is:

1. A method of treating or storing meat, which includes the steps of:

providing a container for meat which is controllably closeable to separate gas present in said container from a remaining ambient gas atmosphere, charging said container with meat and closing said container, physically compressing said meat with a meat compressor in said container and providing a barrier in juxtaposition with said meat to separate a majority of the surface of said meat from direct contact with the gas in the container, reducing free oxygen in the container when separate from the remaining ambient gas atmosphere by evacuating the gas in the container and replacing that gas with a gas low or substantially free of free oxygen via a valve, reducing the temperature of the meat in said container and holding the meat for a period of time under the conditions of compression, reduced free oxygen gas and temperature, for aging of the meat.

2. A method of treating or storing meat as claimed in claim 1, wherein the majority of the surface of said meat is separated from direct contact with the gas present in the container by portions of the container compressor maintaining said meat under compression.

3. A method of treating or storing meat as claimed in claim 2 wherein said meat is provided in a substantially contiguous body formed from a plurality of pieces of meat in juxtaposition.

4. A method of treating or storing meat as claimed in claim 1 including the step of substantially separating the majority of the surface of the meat from direct contact with the gas in the container while said container is placed in vacuum during gas exchange.

5. A method of treating or storing meat as claimed in claim 1 including the step of reducing the free oxygen in the container by partially evacuating the gas from the container and replacing said gas with a gas low or substantially free in free oxygen in a series of repeated cycles.

6. A method of treating or storing meat as claimed in claim 1 including the step of placing the gas low or substantially free of free oxygen in the container under positive pressure relative to ambient at least during a portion of the meat containment period.

7. A method of treating or storing meat as claimed in claim 1 including the step of draining weepage or drip from the surface of said meat to a receptacle portion spaced from said meat yet in communication with said container when closed.

8. A method of treating or storing meat as claimed in claim 1, wherein the gas low or substantially free of free oxygen has an oxygen content upper limit of 5%.

9. An apparatus for treating or storing meat which comprises:

a container for containing meat which is controllably closeable after being charged with the meat in order to separate the contained meat from a remaining ambient atmosphere:

a moveable support within the container for physically compressing the meat in the container and providing a barrier to substantially separate a majority of the surface of the meat from direct contact with gas remaining in the closed container: and a valve operatively connected to the container for reducing free oxygen in the closed container by evacuating gas from the container and replacing the evacuated gas with a gas low or substantially free of oxygen.

10. An apparatus as claimed in claim 9, wherein the meat is formed as a contiguous body of portions of meat in juxtaposition and where the meat is stored in the apparatus at a predetermined temperature above the freezing temperature of the meat.

11. An apparatus for treating or storing meat as claimed in claim 9, wherein the gas low or substantially free of free oxygen has an oxygen content upper limit of 5%.

12. An apparatus for treating or storing meat as claimed in claim 9, wherein the moveable support is operatively associated with a spring in order to compress the meat.

* * * * *